INVENTOR.
CHARLES D. TINKER
BY
Jerome A. Cox
ATTORNEY

United States Patent Office 3,102,720
Patented Sept. 3, 1963

3,102,720
HEAT TREATING FURNACE
Charles D. Tinker, Rte. 1, Granville, Ohio
Filed Aug. 5, 1960, Ser. No. 47,838
3 Claims. (Cl. 263—43)

The invention disclosed in this application relates to furnaces or kilns.

It is illustrated by a furnace similar to furnaces such as are now used and are designed for use in the treatment of refractory or ceramic material by heat for this purpose of "burning" or hardening such refractory or ceramic material to form bricks and other refractories and ceramic ware. However, my invention is useful in many types of furnaces, including those useful in the heat treating of ceramic ware, refractory material, metals, etc. My invention is intended to improve the action and efficiency of such furnaces by preheating the air to be mixed with fuel just prior to combustion so that the fuel is more efficiently utilized.

One of the objects of my invention therefore is the provision of a new and improved furnace or kiln.

A further object of my invention is the improvement of efficiency in such furnaces.

Further objects and features of my invention will be apparent from the subjoined specification and claims when considered in connection with the accompanying drawings illustrating embodiments of my inventions.

Figure 1:
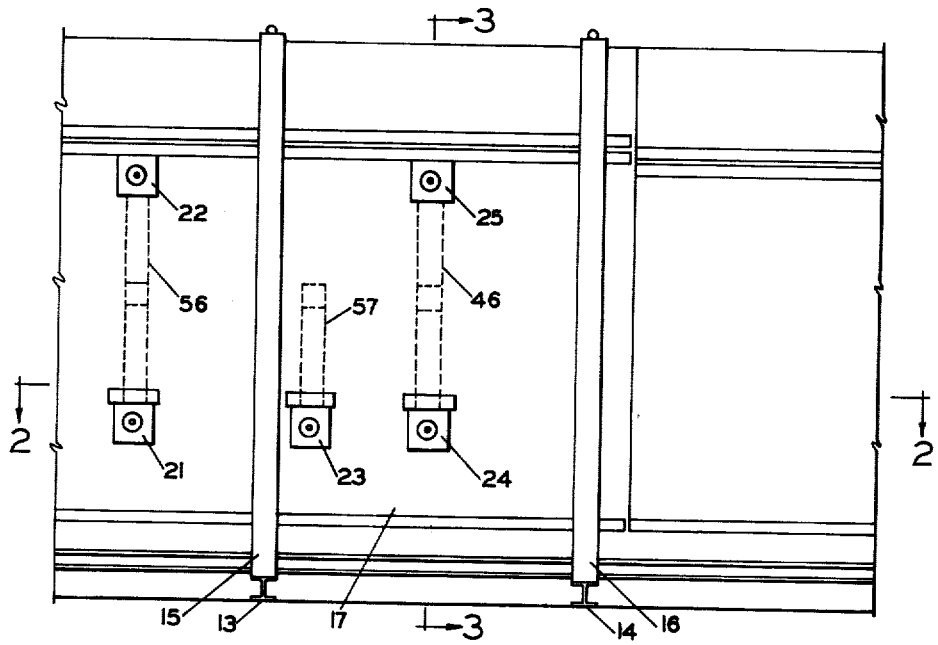
FIG. 1 is a fragmentary view in side elevation of a furnace constituting an embodiment illustrating my invention.

Referring in detail to the drawings, it may be seen that I have shown a furnace 11 having metallic framework including the beams 13, 14, 15 and 16, and constructed mainly of brickwork or other refractory material such as, for example, the bricks shown at 17 in FIG. 1. Ports are provided at various points along each side of the furnace as, for example, at 21, 22, 23, 24 and 25 for the insertion of burners which heat the furnace as will be later described.

Figure 2:
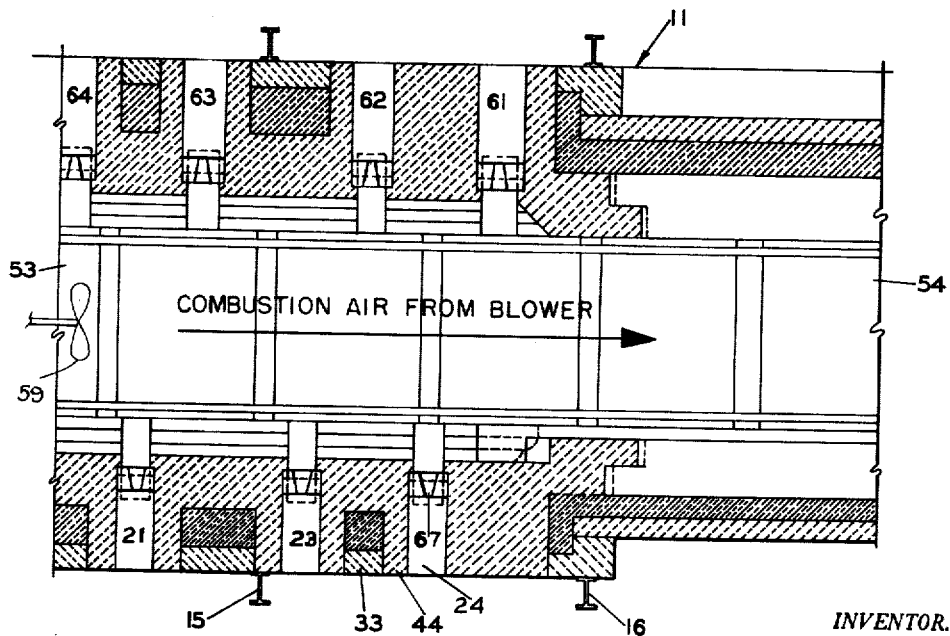
FIG. 2 is a view in horizontal section, taken substantially on the line 2—2 of FIGURE 1, looking downwards in the direction of the arrows.
Figure 3:
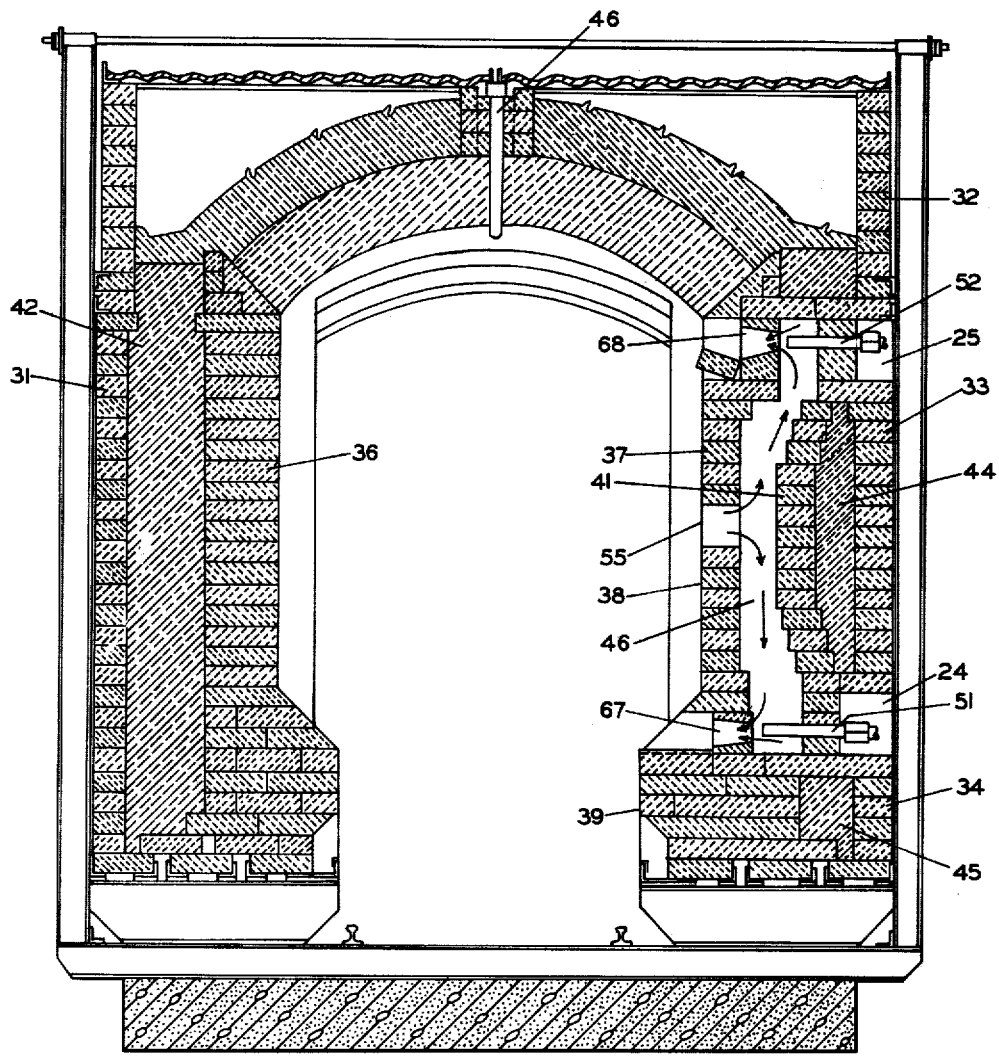
FIG. 3 is a view in vertical section, taken substantially on the line 3—3 of FIGURE 1, looking in the direction of the arrows.

Referring especially to FIGURE 3, it may be seen that the furnace is formed with outer facings of bricks such as are shown at 31, 32, 33 and 34, and with inner facings such as are shown at 36, 37, 38 and 39. An intermediate facing of brickwork is also shown at 41. Between the facings 31 and 36 there is provided a pocket for insulation 42, and between the facings 33 and the intermediate wall 41 there is provided a pocket for insulation 44. Between the outer wall 34 and the inner facing 39 there is provided a pocket for insulation 45. Between the intermediate wall 41 and the inner wall 38 there is provided a flue 46 extending substantially vertically upward, as shown in FIGURES 1 and 3. This supplies secondary combustion air to the burners as will be later described. The burner port 24 is provided with a burner 51 and with a burner block or tuyère 67, and the burner port 25 is provided with a burner 52 and a burner block 68. These burners are similar. Additional like burners are also provided, some of which will be later referred to. Air (well in excess of combustion needs) is supplied to the furnace by a blower 59 through one of the ends such as for example 53 (FIG. 2) and flows through the furnace, and some flows out through the other end as for example at 54. During its passage it is heated by the burning gas and is drawn hot into the flues, such as for example into the flue 46, through air draft passages such as the air draft passage 55. Other flues are provided, such as for example the flues 56 and 57 (FIG. 1). In fact, flues are provided for each of the burners, and air draft passages are provided for each of the flues. Additional burner ports are provided where desired, such as for example the burner ports 61, 62, 63 and 64 (see FIG. 2). Burner blocks are provided in each of these ports as shown in FIG. 2, and burners (omitted for clarity in FIG. 2) are provided for each burner port. The air sucked in through the air draft passages is heated and supplied as secondary combustion air. Primary air is mixed with fuel in the conduits leading to the burners to supply a rich air-gas mixture which is fed through the burners (e.g. burner 51). This is, of course, not pure fuel but is a rich mixture of fuel and air. The mixture has to contain enough air to support combustion and retain the flame on the end of the burner nozzle. However, there is not enough of this primary air for perfect and complete combustion. The air drawn through flues 46, 56, 57 and other similar flues corresponding thereto is mixed hot with the fuel and primary air for efficient, complete, and perfect combustion. For example, the heated air sucked in through the passage 55 passes upward and downward through the flue 46 to the burners 52 and 51. There it mixes with fuel and primary air which is being forced through the burners, and is burned in a stream passing inward into the furnace through burner blocks such as 67 and 68, it being understood that each of the burners has, associated with it, a burner block similar to burner blocks 67 and 68. Some of the flues, as for example 57, extend only part way up from the bottom burner port inasmuch as I provide more bottom burner ports than upper burner ports, and more bottom burners than upper burners. It should be noted that the burners are staggered crosswise of the furnace so that the flow of burning gas from each burner inward of the furnace is directed toward a ceramic portion of the inner face of the furnace and is not directed toward an opposing burner or burner port. However, clean-out ports may be provided wherever desired or necessary.

The burners 51 and 52 and the other burners provided in the ports 21, 22, 23, 24 and 25; 61, 62, 63, 64 and all of the other burner ports; are of special design in order to meet the conditions of this furnace. They are designed so that they will provide means for retaining the flame under conditions of either very lean or very rich mixtures, and so that they will make most efficient use of the super-heated secondary combustion air supplied through the flues. These burners direct a portion of the flames to the interior of the burner tips so that the ceramic material of these burner tips becomes incandescent. These burners can be used to reach extremely high temperatures of from 3250° F. to 3500° F. They are efficient with either very rich or very lean mixtures.

It is to be understood that the above described embodiments of my invention are for the purpose of ilustration only, and various changes may be made therein without departing from the spirit and scope of the invention.

I claim:

1. A furnace comprising a floor, a pair of side walls, and a roof and having openings at the ends thereof;
   means for causing combustion air to flow inward through one of said end openings, lengthwise of said furnace, and out of the other end opening;
   one of the side walls being formed with a pair of burner ports extending laterally therethrough and spaced vertically from each other, and said wall also being formed with a substantially vertical flue connected to both of said ports and positioned intermediate the inner and outer surfaces of said wall, and said wall being also formed with an air draft passage extending through said wall from the inner surface so far as the flue but only so far as the flue at a point spaced substantially vertically from both of the burner ports and intermediate the burner ports; and means comprising a burner tube and a ported burner block in each of said burner ports for drawing heated air from the interior of the furnace through said draft passage, through said flue and into said burner ports to supply said air for combustion to said burners, said ported burner block being provided as a part of said wall and extending from and only from said flue towards the interior of the furnace and formed with a port which is frusto-conical in shape with the smaller area of the port in the burner block towards the flue and with the larger area of the port in the burner block towards the interior of the furnace, and the burner tube being positioned to extend through the outer portion of the wall into the flue so that its outlet end is adjacent to and aligned with the smaller end of the port in the burner block to thus create an aspirating effect which draws air through said flue from said air draft passage to the burner port.

2. The structure of claim 1 in which each of the side walls has a plurality of pairs of burner ports, the ports in each pair being spaced vertically from each other and provided with a burner tube for each port, and in which a vertical flue is provided for each said pair of vertically spaced burner ports connected to both of said ports and positioned intermediate the inner and outer surfaces of the wall, and each said wall is povided with an air draft passage for each pair of burner ports.

3. A furnace comprising a floor, a pair of side walls and a roof and having openings at the ends thereof;

means for causing combustion air to flow inward through one of said end openings, lengthwise of said furnace, and out of the other end opening;

one of the side walls being formed with a burner port extending laterally therethrough, said wall also being formed with a substantially vertical flue connected to said port, positioned intermediate the inner and outer surfaces of said wall, and extending upward from said burner port, and said wall being also formed with an air draft passage extending through said wall from the inner surface thereof so far as the flue but only so far as the flue at a point spaced substantially vertically above the burner port and there connected to said flue; and means comprising a burner tube and a ported burner block in said burner port for drawing heated air from the interior of the furnace through said draft passage, downward through said flue and into said burner port to supply said heated air for combustion to said burner, said ported burner block being provided as a part of said side wall and extending from and only from said flue towards the interior of the furnace and formed with a port which is restricted on the side thereof toward the flue and is flaring on the furnace side thereof, and the burner tube being positioned to extend through the outer portion of the wall into the flue so that its outlet end is adjacent to and aligned with the constricted end of the port in the burner block to thus create an aspirating effect which draws air downward through said flue from said air draft passage to the burner port.

References Cited in the file of this patent
UNITED STATES PATENTS

| | | |
|---|---|---|
| 1,421,155 | Booth | June 27, 1922 |
| 1,896,910 | Merkt | Feb. 7, 1933 |
| 1,919,322 | Dressler | July 25, 1933 |
| 1,926,714 | Culbertson | Sept. 12, 1933 |
| 2,215,079 | Hess | Sept. 17, 1940 |
| 2,402,045 | Hess | June 11, 1946 |

UNITED STATES PATENT OFFICE

CERTIFICATE OF CORRECTION

Patent No. 3,102,720 September 3, 1963

Charles D. Tinker

It is hereby certified that error appears in the above numbered patent requiring correction and that the said Letters Patent should read as corrected below.

Column 1, line 11, for "this" read -- the --; column 3, line 14, for "said wall" read -- said side wall --.

Signed and sealed this 7th day of April 1964.

(SEAL)

Attest:
ERNEST W. SWIDER

Attesting Officer

EDWARD J. BRENNER

Commissioner of Patents